(12) United States Patent
Jensen

(10) Patent No.: US 6,533,125 B1
(45) Date of Patent: Mar. 18, 2003

(54) METHOD AND APPARATUS FOR BATCHING-OUT ITEMS SUCH AS POULTRY PIECES

(75) Inventor: Svend Bækhøj Jensen, Egå (DK)

(73) Assignee: Scanvaegt International A/S, Arhus N (DK)

(*) Notice: Subject to any disclaimer, the term of this patent is extended or adjusted under 35 U.S.C. 154(b) by 0 days.

(21) Appl. No.: 09/806,505
(22) PCT Filed: Oct. 15, 1999
(86) PCT No.: PCT/DK99/00564
§ 371 (c)(1), (2), (4) Date: Jun. 20, 2001
(87) PCT Pub. No.: WO00/23771
PCT Pub. Date: Apr. 27, 2000

(30) Foreign Application Priority Data

Oct. 15, 1998 (DK) .......................................... 1998 01319

(51) Int. Cl.[7] .................................................. B07C 5/16
(52) U.S. Cl. ........................ 209/592; 209/645; 209/657; 209/933; 198/370.02
(58) Field of Search ................................ 209/592, 645, 209/656, 657, 933; 198/359, 360, 364, 370.01, 370.02

(56) References Cited

U.S. PATENT DOCUMENTS 5,881,889 A * 3/1999 Poulsen ..................... 209/657
5,998,740 A * 12/1999 Kvisgaard et al. ...... 209/645 X
6,151,866 A * 11/2000 Connell ................... 209/657 X

FOREIGN PATENT DOCUMENTS

| GB | 2 116 732 | 9/1983 |
| WO | WO 95/25431 | 9/1995 |
| WO | WO 96/08322 | 3/1996 |

* cited by examiner

Primary Examiner—Tuan N. Nguyen
(74) Attorney, Agent, or Firm—Nixon Peabody LLP; David S. Safran

(57) ABSTRACT

A batcher apparatus having a weighing station (4) for arriving items and a sorting-out station (6) with transfer mechanism for selectively transferring the weighed items to a plurality of receiver stations (18, 18', 18"). According to the invention two or more receiver stations may be used as substations (18', 18") being allocated items weightwise belonging to the same batch (26), whereby it is possible to allocate to each batch item, which are selected not only based on their weight, but additionally based on other criteria such as type of item in connection with co-batching of different types of poultry parts to be batched separately in subbatches which are then merged into the full batch. Also, items may be allocated to one substation or another in order to thereafter be acted upon in a specific manner, e.g. for some items to be turned or marked.

16 Claims, 3 Drawing Sheets

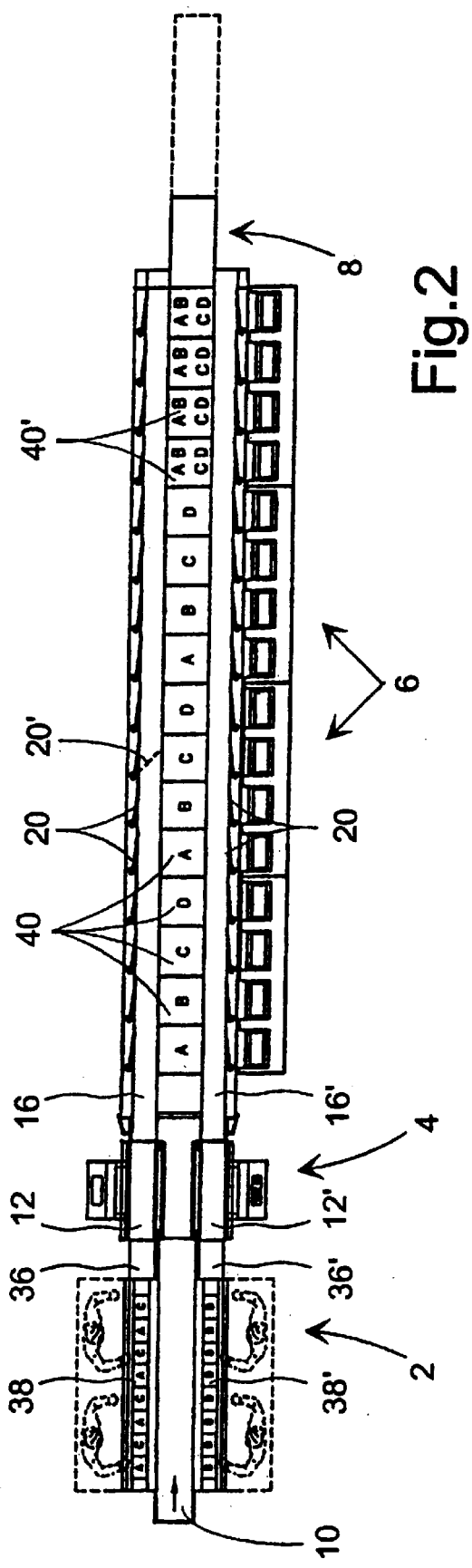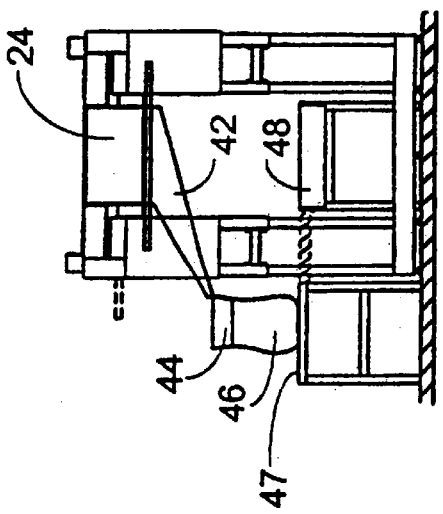

METHOD AND APPARATUS FOR BATCHING-OUT ITEMS SUCH AS POULTRY PIECES

BACKGROUND OF THE INVENTION

1. Field of the Invention

The present invention relates to a method and an apparatus for the batching out of items with non-uniform weights, in particular foodstuff items. The invention is closely linked with the so-called grader technique, involving the use of a portioning-out apparatus having conveyor means for moving a flow of items through a dynamic weighing station and thereafter along a sorting-Out path, along which there is arranged a row of receiver stations with associated diverter means which, controlled from a control unit connected with the weighing station, can be actuated in a selective manner in order to divert the individual items into respective receiver stations for building up therein batches of items amounting to at least a predetermined total minimum weight or target weight, within given limits.

2. Description of Related Art

The prior art, e.g. as disclosed in GB 2 116 732 and WO 96/08322, provides for the repeated building up of one full batch in each of the receiver stations, but in particular in WO 96/08322, it is indicated that it is perfectly possible to operate with different target weights in or for different receiver stations, hereinafter also referred to as "bins." Such a differentiation is useful for different purposes, as discussed in more detail below, but already at this place, it should be emphasized that a major aspect of the present invention is the use of at least some. of the receiver stations as substations for receiving selected items to be merged into one full batch with a predetermined target weight, and thus, holding items received from more than one receiver station.

This will introduce a possibility of co-batching items selected on the basis of criteria other than or in addition to the weight criterion, whether referring to characteristics of she incoming items, e.g. color or "type", or to acts to be performed on the items upon their delivery to one or another substation, respectively, e.g. in being selectively provided with a color marking or being orientationally reversed or otherwise treated or handled in or at the outlet side of the respective receiver substations, before the collection of the items in the "final batch."

A highly relevant example of the use of the invention pertains to the industrial handling and packaging of the cut pieces of parted poultry, with specific reference to the huge chicken industry. In that connection, by way of example, it is a widespread practice to produce so-called "catering packages," each holding four isolated groups of predetermined numbers of breast pieces, thigh pieces, leg pieces and wings, respectively, said groups having part-weights such that when they are brought together they will amount to a predetermined total weight. A typical example will be to produce packages (boxes),.each with four bags containing 24 pieces, i.e., with a total content of 96 pieces with a total weight of 34 lbs. for the pieces from the lower weight class and 38 lbs. for those from the higher weight class. A suitable part-weight is determined for each of the four bags, thus, for example, for the "light" pieces 12.7 lb breast 10.2 lb thigh 6.2 lb wings 4.9 lb lower leg ("drumstick")

in all 34.0 lb for 96 pieces.

In order to maintain these part-weights in a reasonably reliable manner, in practice it will be unavoidable that some overweight will be involved, and when these overweights are summed up in the composition of the four bags, the result can be a quite considerable overweight ("give-away") of each of the total packages. To these costs must be added those of additional labor that may be needed with larger high capacity packing lines.

Using the grader technique for the production of the individual "bags" will greatly facilitate the building up of the required subgroups therein, even with a minimized overweight thereof, yet still with some overweight and still with operators having to merge the different bags into final packages.

SUMMARY

According to the present invention, however, it will no longer be important to use the criterion that each of the four "bags" must absolutely appear with an independent minimum weight. With the manually-controlled portioning-out, the criterion has actual significance in that, for the operators, it will be almost hopeless work both to control a more-or-less correct bag filling and to carry out a "bag grouping" for fixed weight on the basis of bags whose weight can lie both slightly above and slightly below the specified "category weight," but with the use of a suitable grader control this will not be any problem, in principle even completely without manual assistance. The system can be programmed in such a way that in groups of four different receiver bins, the respective item portions are built up for the filling of "bags" with more-or-less the desired own weight, but with the main condition that the weight of the four bag portions together shall be down as closely as possible to the prescribed total weight of the sum of the bags.

In practice, this will mean a drastic change with respect to the overweight occurring in the total portions ("the boxes"), in that this will regularly be able to be reduced to a previously unobtainable minimum, while at the same time the operating work can be limited to an absolute minimum. The available chicken pieces can be utilized with increased efficiency without any noticeable inconvenience for the associated customers. For these it will be quite without significance whether a bag with, e.g., 24 leg pieces weighs slightly less than expected, if this is compensated for by corresponding overweight occurring in some of the other bags. In such cases therefore, the customer is supplied with a fully useable and acceptable quantity.

Moreover, with the invention the work at the producers can be achieved with a minimum of waste in the form of items or "bags" which are not suitable for batching together with other items or bags for the building-up of portions with reasonable relevant weight, and such a minimization, which does not concern the customers, will obviously also be of the greatest interest to the producer.

In order to achieve the desired result, the grader equipment must be kept informed concerning the kind of items successively supplied, i.e., if the variance in the weight of said items is not sufficient in itself to clearly identify the item types. If, for example, a leg piece from a heavy chicken weighs wore than a breast piece from a lighter chicken, the control equipment will not be able to clearly identify the item type, and consequently it may not have the possibility of being able to place the item together with an item of the same kind. This problem can possibly be overcome by using visual scanning equipment which can identify the kind of successively arriving item, or by the equipment feeding the item being supervised by an operator who provides the control equipment with a type-identifying code.

It is also possible to arrange the equipment which feeds the item to the grader in such an operator-controlled way that the item per definition will be introduced in a predetermined type sequence, whereby the control equipment will automatically be informed concerning the kind of item successively being supplied.

A further and highly realistic possibility is for the item to be fed along separate tracks, from which the item are automatically transferred to the weighing line with associated automatic transfer of identification signals to the control computer. Moreover, there is the possibility of being able to use two parallel weighing lines to which two types of item are fed selectively, namely respective pairs of item types, which in general have such great mutual weight difference that each of the two weighing lines can themselves identify the item types. The items can, e.g., hereby be supplied in a coherent, irregular flow to a separating station where two operators transfer the respective item types to each their weighing line, and ensure that the items are placed on these with sufficient space between them so that they can be identified at the subsequent weighing.

On the level of principle, it will be possible to carry out the disclosed method with the use of an ordinary grader, the control unit of which is programmed so as to execute batching of the relevant numbers of items of different types up to a predetermined total target weight, and so as to thereby allocate the items of the different types to respective different receiver stations. Thus, the grader will make use of a relevant number of its ordinary receiver bins for the forming of one batch, the item sub groups or "bags" being manually or automatically unloaded from the bins and brought together into one "box".

For a grader according to the invention, however at least when the arm is dedicated to operate exclusively with the relevant "multi product batching", it is preferred for the sake of simplicity to arrange for the relevant "sub bins" to be physically grouped close to each other and to be in operative connection with outlet guide means leading to a caution batch collector station. The latter may be a container, a platform at a belt, from which, the received bags can be transferred to a relevant "box", or the collector station may be the box itself, then the operator takes care to place in each collector wits a box ready for direct reception of a following batch. The bins or "receiver substations" are used for the bagging of the items, and the said outlet guide means may then be constituted by a fixed chute installation leading the bags to a specific collector site for each group of interrelated bins.

The invention is relevant whenever there is a reason to distinguish between items which, weightwise, can be accepted as belonging to one arid the earn batch, whatever the criterion of such distinguishing may be. Specific "types" of items as discussed above will not be limited to different body parts of poultry, but may as well refer to a selection e.g. of three red apples in batches of ten red and green apples or seven large slices of smoked salmon in batches of twenty larger and smaller slices. Also, if whole fishes are supplied with non-uniform orientation, it may be desirable to effect a turning of some of them once it has been decided to which batch they should be allocated in order to ensure that in that particular batch the fishes will be deposited generally with opposite orientations in order to effectively fill up a fish box to a reasonably horizontal level. It follows that whenever the fishes are supplied with uniform orientation it may or will be required to effect a turning of some of them upon their being allocated to a specific batch, and in this respect it is very convenient if or when such a turning can be effected methodically for all items delivered to one receiver substation, while in a counterpart station the items are received and transferred to the collector box without being turned.

As discussed in more detail in PCT/DK99/00235, these turnings can be established in several different manners, however widely based on the separation principle of the present invention.

Also, in connection with almost all kinds of foodstuff pieces there may be pieces which are of equal weights, but are otherwise different in various respects, be it with respect to color, specific dimensions such as length, structure or partial damaging, and for a given batch it may be desirable to load a box with "regular" pieces at one end of the box and "irregular" pieces at the other end of the same box. According to the invention, this is easily achievable once the relevant character of the pieces has been detected, e.a., by means of a vision system, viz, in supplying the selected pieces selectively to two different receiver stations, from which they are conveyed to the respective opposed end areas of a collector box, preferably along a common chute element.

In the following the invention will be described in more detail with reference to the drawing.

BRIEF DESCRIPTION OF THE DRAWINGS

FIG. 2 is a top view of a conventional grader operating with a modified mode of function in accordance with the invention, FIG. 3 is an end view of a conventional grader.

DETAILED DESCRIPTION OF THE INVENTION

Figure 1:
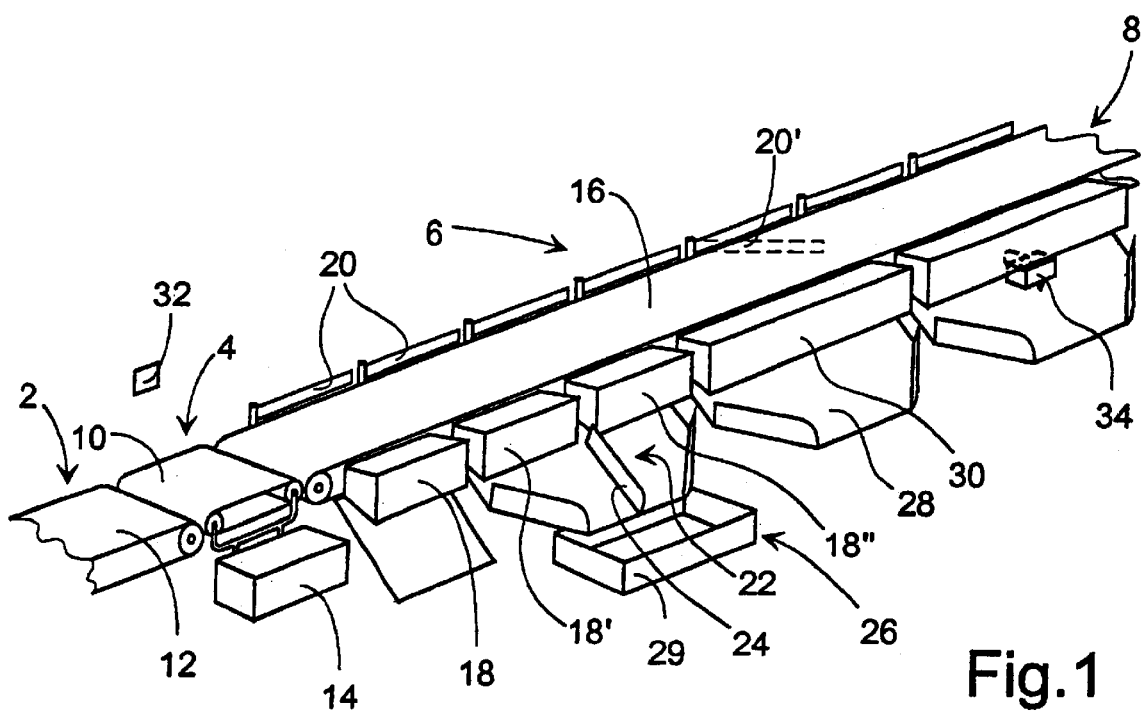
FIG. 1 is a perspective view of a grader according to the invention.

FIG. 1 shows a grader installation seen from above, the main parts being a product supply section 2, a weighing section 4, a sorting section 6 and a delivery station 8.

The supply section 2 has a supply conveyor 10 on which items to be batched are fed in an irregular flow in the form of a combination of two different types of items, which have not been sorted in any way beforehand. The weighing station 4 has a conveyor belt 12 and is connected with a control unit 14. The sorting section 6 has a conveyor belt 16 which passes along a row of receiver stations each represented by a receiver 18 in the form of a bin with or without a bottom and, as shown at the opposite side of the belt 16, respective diverting wings 20 which, as shown at 20', are controllable to be swung inwardly over the belt 16 so as to effectively divert a selected item to a selected receiver bin 18, governed by the control unit 14, all this being a well known technique.

A novel feature, however, is that at a majority of the receiver stations there is arranged, underneath different pairs of receiver bins 18', 18", a common chute 22, optionally with a middle partition 24, leading to a common receiver area 26, e.g., holding a packaging box 28 to be changed upon receipt of a full batch of items. The receiver bins 18', 18" may even be combined into one long bin 30, with or without the common chute 28 thereof having a middle partition 24.

At the infeed end of the sorter belt 16, whether before, in or just after the weighing station 4, there may be arranged sensor means generally designated 32, e.g., vision equipment, for recognizing and evaluating any relevant character of the incoming items, be it color, type, length, width, structure, completeness or the like. The unit 32 is connected to the control unit 14 such that the latter, in its allocation decisions, can decide whether a given item of a relevant weight for inclusion in a given batch should be delivered to one or the other of two "double bins" 18' or 18" in order to be deposited at one or the other end or half of a receiver box 29 or, respectively, to one or the other end area of a "long receiver bin 30" with the same purpose.

In some instances, there will be no restriction with respect to depositing of items of different characters at one or the other end of the boxes 28, and in such cases, of course, there will be no need for the partition 24 on the chute 22.

As mentioned, while a registered characteristic of a weightwise relevant item may be decisive for its allocation to one or another subreceiver station (18' or 18"), another criterion for such a selection may be based on requirements for special acts to be performed on specific items of generally the same character allocated to the same collector area 26. As an example, FIG. 1 shows that, at one end of a "double bin" 30, there can be provided a marking unit 34 operable, for some reason, to spray mark all items selected to be delivered to that end of the long bin 30, while the items delivered at the opposite end of the long bin will not be correspondingly marked. Other successive acts could be performed, such as a turning of non-symmetrical items in order to merge the items in substantially horizontal layers in the boxes 29. In such cases, of course, there will be no need for any "character detector" 32.

FIG. 2 shows a grader apparatus having a supply section 2 with a supply conveyor 10 on which frozen chicken pieces are fed in an irregular flow in the form of a combination of the four already mentioned types of pieces, without these having being sorted in any way beforehand. Along each of the opposite side edges of this conveyor is a narrower conveyor 36, 36', and these conveyors run under respective cell-divided feeder units 38, 38' in such a manner that the indicated operators at the opposing sides can grip the chicken pieces arriving on the central conveyor for selective placing of these in associated, dedicated cells marked with the letters A, B, C and D.

The letters can, for example, refer to the following types of pieces:

A=wings
B=breast pieces
C=upper leg pieces
D=lower leg pieces (drumsticks)

It is hereby ensured that type-determined, mutually separated pieces are supplied to the conveyors 36, 36' and that these are in well-defined positions on the conveyors. As will be seen, it has been found expedient that each of two operators at the respective two sides shall concentrate only on the selection of the two different types of pieces, such as A, C and B, D respectively, but otherwise it will apply that a corresponding selection can be made by automatic means, e.g., by using visual scanning equipment. The object of the relevant selection and selective placing on the conveyors 36, 36' is to make it possible for the subsequent weighing and control unit 4 to keep track of the type of the passing items regardless of whether they overlap one another in weight.

The conveyors 36, 36' deliver the items to the through-going conveyor sections 12, 12' in the weighing station 4, in which the type and the weight of the individual, mutually separated items are registered in the associated computer 14.

Thereafter, the weighing conveyors 12,12' deliver the items to the conveyors 16,16' which extend along the sorting section 6. Along this at the opposite outer edges of the conveyors 16 and 16', sweeper blades 20 are arranged which can be swung in over the respective conveyors under control from the weighing computer 14, 50 that each conveyed item, such as shown at 20', is able to be directed for selective delivery to each of a number of stationary receiving bins 40 arranged in a central row in between the conveyors 16 and 16', controlled by the weighing computer. It is thereby possible to sort out the fed pieces to the receiving bins 40, each of which is dedicated to the receipt of pieces of identical type, designated A, B, C and D, respectively.

In FIG. 3, it is shown that sideways-sloping discharge chutes 42 can extend from the bottom of the receiving bins to respective bag holders 44, so that each bin, after or during its reception of item up to a certain weight, can be emptied into a bag 46, which, standing on a table plate 47, can be loosened from the bag holder by an operator and, after being closed, can be pushed in on to a central conveyor 48, the discharge end of which emerges at the delivery station 8. From here, the, bags can be removed for packing in boxes, which typically accommodate four bags, i.e., one of each of the four types A, B, C and D, and each containing, e.g., 24 pieces of the respective products. These packages are called catering-packs, and efforts must be made at the portioning-out to ensure that the each bag with 24 pieces achieves a target weight which will give the required target weight of the four bags, e.g., 34 or 38 lbs.

From the above it will be understood that arbitrary A, B, C and D bags can be removed from the portioning-out line and conveyed together for packing in the said portion boxes, and according to conventional practice, the operator shall thus merely ensure that a group of these four different bag types appear at each delivery, regardless of from which receiving bin they originate.

In practice this means that, in order to avoid underweight, work must be effected with a certain overweight tolerance on the individual weights, and the smaller this tolerance, the greater will, be the number of individual products which cannot be placed in any of those portions which are being batched, and these products must therefore be fed at over the ends of the conveyors 16 and 16' in the delivery area for recirculation. The effect of this can be an appreciable reduction in the working capacity of the grader, and the supplier is therefore tempted to accept a distinct overweight, which can result in a satisfactory and costly fourfold overweight in the total packaging.

As will be seen from FIG. 2, a smaller number of receiving bins 40' are provided at the discharge end of the conveyors 16 and 16', and these are marked with all four letters A, B, C and D. This provides for the possibility of being able to intercept items which are not able to be placed in any of the bins 40, in that these item, i.e., all four types, can thus be collected in so-called 'family' packs or retail portions. The aim can thus be to collect portions up to a given total weight, here possibly with a more generous tolerance for overweight.

With the invention, it is possible to make radical changes in these conditions, so that the grader, with regard to the main task to be carried out, can work with high capacity when supplying total portions with minimized overweight.

A first and very simple solution can be for an agreement to be entered into with the buyer, whereby the buyer accepts that in the total packages there can be a small percentage which are slightly underweight within a given limit. This could enable the general price for total packages to be lowered. The basis for this will be that the tolerance requirements for the individual portion packages (the bags) will be reduced, and that a modest bag underweight can be tolerated. Because the underweight can only be small, it will only arise in a small number of part-portions, and since in the complementary part-portions there can thus continue to arise a certain overweight, when the part-portions are batched it will not be typical for these to comprise identical underweight portions, so that in by far the majority of cases one or two underweight part-portions will be brought together with three or two overweight portions, whereby there will generally arise a close approximation of the intended total weight.

Regardless of such agreement, an underweight total portion will occur only extremely rarely, while the grader has had the advantage of being able, to combine one or more underweight portions with one or more overweight portions, and herewith allowed fewer products to pass for recirculation, i.e., has generally been able to work with increased, capacity and reduced total overweight.

A second and even better solution will be that the control unit, in accordance with the same criteria, establishes an organized relationship between every four or any other relevant number of adjacent receiving bins 40, in such a way that the batching of the product in these is directed towards arriving at the predetermined full weight for the total portion, with less importance directed to precise individual portion weights. The operator merely needs to know how the different receiving containers are related in groups. In this connection, it could be helpful for control lamps at the individual receiving stations not to be lit simultaneously, e.g., at all four stations, until the total portion is ready to be delivered, regardless of whether one or more of the bins 40 have already received the prescribed number of products and have been ready for emptying for some time.

A grader which is to work only in accordance with the invention will not need to have lead-out blades 20 on both Sides of the bins 40 along the section forward to the containers 40', since these blades need only to be provided opposite those bins with which they are required to cooperate.

Figure 4:
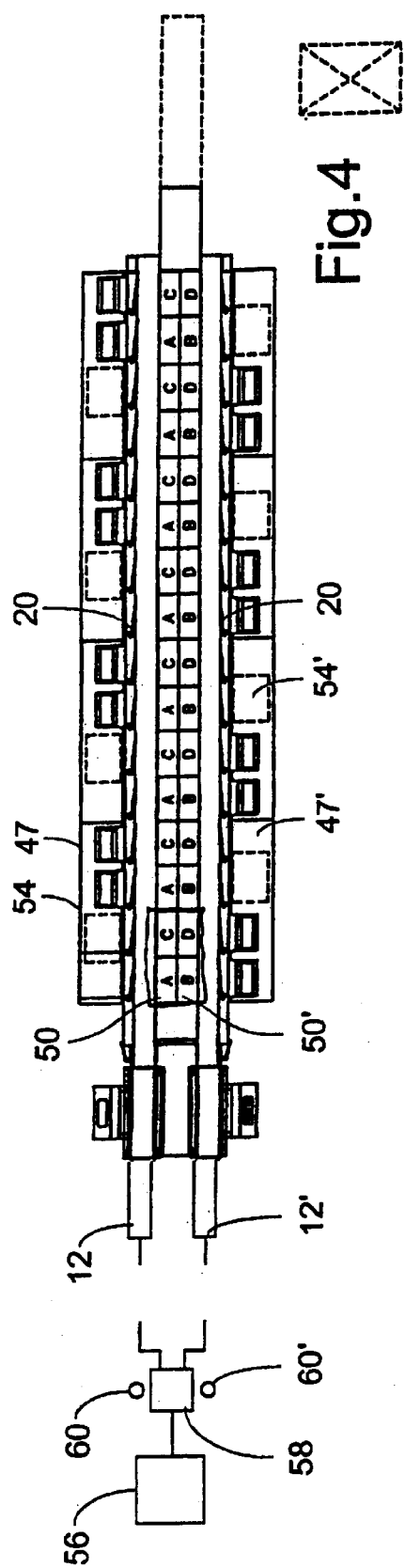
FIG. 4 is a top view of a grader according to the invention.
Figure 5:
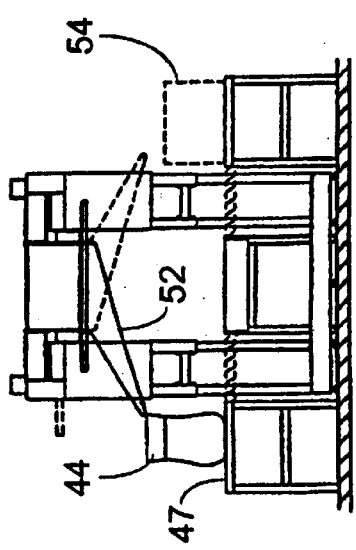
FIG. 5 is an end view of a grader according to the invention.

FIG. 4 shows a grader installation with a sorting-out section which is especially arranged to work in a more expedient manner in accordance with the principle described above connection with the receiving bins 40 in FIG. 2. Here, each of the bins 40 cf. FIG. 2 are divided in the middle to form two individual bins 50, 50' with lead-out blades 20 on both sides of each set of bins, so that a complete bin set A-B-C-D, seen in the longitudinal direction of the grader, will take up only half the space than is the case in FIG. 2. Each of the related double bins, i.e., A, B and C, D, have a common discharge chute 52 to the same side (FIG. 5), while the subsequent double pair of these containers have their discharge chutes 52 turned towards the opposite side, cf. FIG. 5. For each set of four individual containers, bag holders 44 will thus be disposed only at the one side, while, the place on the support table 47, 47' for the bags 46 at the opposite side will be empty. Consequently, this free space can be used in an expedient manner for the accommodation of a box 54 which can be used by the operator for the collection of those bags which at the same side will appear with the next following or preceding pair of double containers, after which the operator can push the filled box in on the discharge conveyor 48. Upon arrival at the discharge area B, the boxes can. simply be transported further for delivery as fully-finished package units.

Here, it will continue to be decisive to ensure via the control unit that the product. build-up in each of the pairs of double containers 34 (A, B, C, D) is controlled in such a way that the measured weight relates predominantly to the whole of the product group A+B+C+D, rather than to the individual parts in these groups.

In FIG. 4 is shown a modified embodiment of the product supply station 2. The parted pieces of poultry are fed in to run-through freezer 56, and from here they are conveyed to separation station 58 where two operators 60, 60' separate the items for the respective weighing conveyors 12 and 12', and hereby ensure that the distance between the items placed on these conveyors is such that it can be detected by the associated weighing system 4 itself whether the passing items are respectively A- or C-items or B- or D-items.

It is to be emphasized that the weighing function can be executed in any weight determining manner, e.g., based on vision detection or on weighing means connected with an overhead structure for carrying the weighing station without the items being supported from beneath.

As suggested already in said WO 96/08322, the items should be supplied in reasonable mixed formation in order to ensure a frequent occurrence of each of the item types, and the grader may be programmed so as to effect allocation of types to the different bins in different sequential orders, one bin, for example, calling for A-B-C-D types, another for B-C-D-A types, and so forth, in order to ensure that at least most of the time there will be a need for each of the item types. This will apply especially to the already discussed consecutive building up of respective sub portion of items of different types, some sub portions with some underweight allowed or preceded by other sub portions of some overweight, this greatly facilitating the total batching work and thus increasing the batching capacity and decreasing the giveaway.

The sequence pattern for the individual bins should not necessarily be predetermined, insofar as the computer may well be programmed to make coordinated decisions with respect to choice of "new type" for the individual bins, specifically with the purpose of smoothing out the demands for the different types so as to keep the general batching capacity high.

In practice, however, it is not a condition that the relevant sub batches should be built-up in a strictly consecutive manner, as the controlling computer can well handle a dual building up of all of the sub batches at the same time still aiming at a predetermined total target weight of entire batch, but also, in combination, with respect to the formation of the individual batches.

According to the present invention, it has been recognized that the same principle is applicable in a simplified manner whenever the weight distribution of or in the supplied flow of items can be anticipated, e.g., in connection with an intake of item supposed to be weight distributed according to a "normal distribution" as expressed by a so-called Gauss-curve. Previously, viz, in the already mentioned GB 2 116 32, it has been suggested to take advantage of such a know-edge in connection with the batching of items of one single type, but it is now. realized that the same knowledge is perfectly usable in the batching-together of item of different types, when the weight distribution of these different types an be estimated beforehand, without relying on any specific histogrammatic recording or on sophisticated probability calculations. The main principle is that it is possible, based to simple combinatory calculations, to merge item in such a inner that during the building up of a batch the accumulated tight will gradually approach a value, from which the batch in be completed by one or more item of the average weight of the distribution, i.e. item most frequently occurring in the incoming flow of items, whereby the batches can be concluded in an expedient manner in order to ensure a high batching capacity. Items clearly deviating from the average weight may be used at the beginning of each batching.

Figure 6:
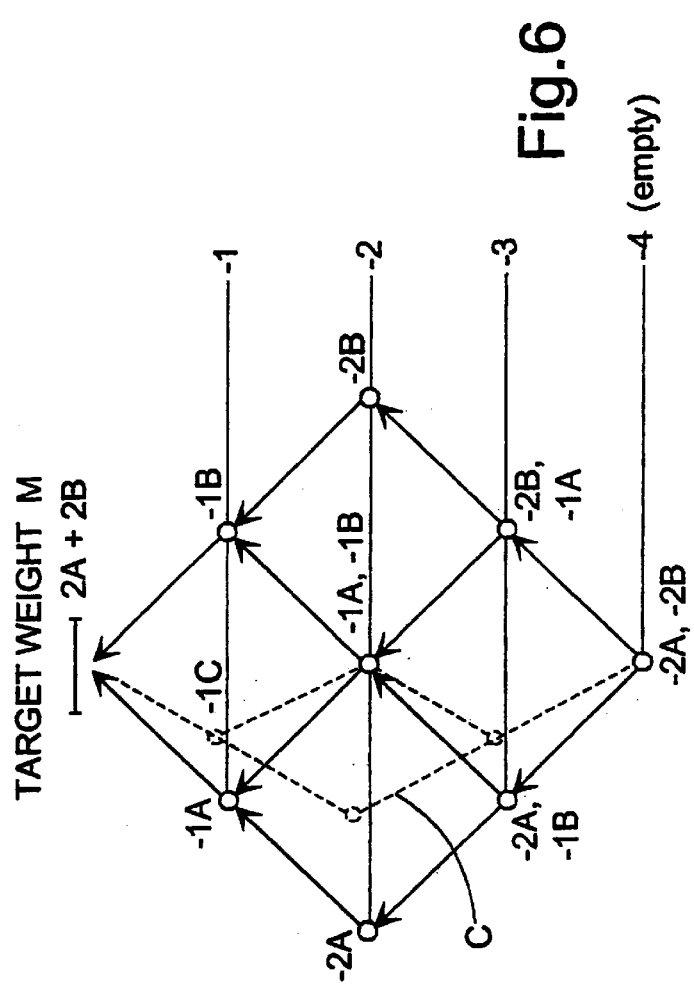
FIG. 6 is a calculation diagram.

To illustrate this, in the present connection, FIG. 6 indicates a calculation model for the determination of "best choice" in allocating item to a selected bin when the same missing 4,3,2 and 1 item or item, respectively, in order build up therein a batch of 2×2 item of two different types A and B. In connection with a natural weight distribution the respective two types an ideal choice of the batch target weight, H, should be the double sum of the average weights of the items of the respective types, or a well defined target range across or adjacent to this sum weight.

When a given bin is missing 1 item as represented by the line −1 in FIG. 6, it will of course be either an A- or a B-item, as the partial batch was put together so that just one item exhibiting the average weight of the relevant respective distribution (A or B). Such a weighed-in item can be quickly located and so allocated. When 2 items are missing, cf. line −2, these will be either 2 A-items, 2 B-items or 1 A- and 1 B-item, i.e., there wil be three options. The computer, knowing the available and expected item types and weights according to the respective weight distributions and also knowing the weights of the collected items in all of the bins missing two items, will then decide "best choice" for any new item to be allocated to such a bin which, when thereafter missing one item in stage 1, will have the better likelihood of being built up to the target weight M. It will be understood that the required two items can be selected, each, within relatively broader weight ranges, insofar as they should only fulfill the condition that the sum of their weights should build up the partial batch weight of the items in the selected bin to the point or narrow range, from which the batch can be completed by one item from the average weight range of the items of either type A or type B.

When 3 items are missing (line −3), such items will be either one A-item plus two B-items or one B-item plus two A-items, i.e., now with still more combination options that will satisfy the conditions for the building up of the relevant partial batches to the stage where they miss only two items. Here again, the individual items can be selected from a still broader weight range of the respective item types, when only the sum of weight of the three items is sufficient to satisfy the conditions of stage 2.

In step 4, which will be the first step of item selection for the building up of a batch in any bin just requiring a first item, it will at least in principle be possible to select freely from the two types of items and from the entire range of the respective distributions, realizing the possibility of thereafter, in stage 3, further building up the partial batch weight to satisfy the conditions of that stage.

It should be considered, however, that it will not always be possible to exploit all of the items of a given distribution, in particular, because a selection of a first item from either end of the spread of the distribution may make it practically impossible to thereafter arrive at a predetermined target weight. In such cases, it will be a preferred possibility to sort out or neglect all of these extreme items, which are relatively few in number and then accept that the effective weight range of the distribution is correspondingly restricted.

In FIG. 6, the course of sequence of the required calculations is illustrated in solid lines in two dimensions only, Linked with the handling of but two different types of items, each exhibiting individual weight distributions. If items of three different types are involved, the same calculations can be extended to comprise even the presence of "C type item" in a third dimension as shown in dotted lines, and if still further types are added, it will thus be adequate to speak of calculations in a "multidimensional space", as also proposed in WO 96/08322 in connection with histogram based on probability calculations.

Some co-batching jobs may be connected with special conditions to be observed. Thus, for the batching of different chicken parts in pairs, it may be set as a condition or at least a preference that the parts in any pair should be of reasonable uniform weight, i.e., originating from the same relatively narrow weight range, in order to look "natural." Generally, the customers will not find it particularly remarkable if, in a packing with 2×4 chicken parts, the respective pairs of parts originate from chickens of pronounced different weight classes, when only the parts of the individual pairs are reasonably alike, and the grader system, therefore, will still have good possibilities to merge items so as to form pairs or even larger numbers of items with substantially equal weights and yet arrive at batching results with acceptable tolerances out from a wide weight range of the respective types of items.

In the foregoing, it has been assumed that the overall goal is to make up batches holding a predetermined number of items amounting to predetermined target weights (weight ranges, weight distributions). It is a still further aspect of the invention, however, that while it is still desirable to work with one or more predetermined target weights, it will be practicable to renounce the requirement as to the predetermined number of items in the batches. It has been found that with the aid of modern signal analysis equipment, whether operating in real time or in high speed simulation mode, it will be possible for the batching computer to recommend, generally or periodically, to build up all or some batches with another number of items in order to reach the target weight more economically (small give-away overweight, small rate of recycling of unplaceable items). Such a recommendation can be conveyed to a batching operator, who will then decide whether the recommendation should be followed, perhaps in view of other conditions, or the computer may be set to imply institute switches between different numbers of items in all or some of the batches whenever this is found appropriate and permissible. In connection with co-batching of items of different types such shifts may be effected individually for each type of items.

It will be appreciated that in connection with the invention it will be possible to set up a long row of different batching conditions, relating to fixed or variable numbers of each or some of the respective types of items in each batch or in respective different batches;

fixed or variable target weight of each type of the respective items in each batch, including fixed target weights for one or more types and variable target weight for one or more other types;

different batching conditions for respective individual receivers or bins, including selection of different combinations of respective types off items;

fixed or variable batch weight with fixed or variable target weight or numbers of respective types of items.

What is claimed is:

1. A method of controlling operation of a weighing-out apparatus of the grader type having a weighing-in station, a sorting-out path, at least one row of receiver stations with associated diverter means for enabling selective transfer of items to said receiver stations, a conveyor for moving articles serially through said weighing-in station and along a sorting-out path, at least one row of receiver stations arranged along said sorting-out path, a control unit connected with the weighing-in station, comprising the steps of:

serially conveying articles through said weighing-in station, weighing the articles and conveying the articles weighed along said sorting-out path, using said control unit to operate said diverter means in a manner effecting an accumulative and weight determined build-up of desired groups of items in respective receiver stations, using at least two of the receiver stations as a single combined station, using the control unit to allocate items to the each of the least two receiver stations of the combined station to define a final batch having an associated target weight wherein allocation of an item to one of the at least two receiver stations of the combined station is controlled in order to compensate for the weight of other of the at least two receiver stations in order to provide a final batch weight within a predetermined tolerance; and merging of items allocated to the at least two receiver stations of the combined station.

2. The method according to claim 1, wherein during the allocation of an item to one of the at least two receiver stations of the combined station an additional criteria related to the physical characteristics of the item other than item weight is used along with item weight to allocate the item to the receiver station of the combined station.

3. The method according to claim 2, wherein the criteria characteristics pertain to physical appearance of the items.

4. The method according to claim 3, wherein the criteria characteristics that pertain to physical appearance of the items are selected from the group consisting of type, shape and color.

5. The method according to claim 2, the specific criteria are ascertained by detecting characteristics of the individual items prior to entry thereof into said sorting-out path and feeding characteristics detected to said control unit.

6. A method according to claim 1, further comprising the steps of presorting the items according to subcriteria and placing the items in respective dedicated positions on an infeed conveyor of the weighing station, the control unit keeping track of the absolute positions of said dedicated positions.

7. A method according to claim 1, comprising the further step of ascertaining a relevant criterion characteristic pertaining to an action to which a selectable item should be subjected upon its delivery to a receiver station and prior to its being finally rested in a respective final group based on special conditions for the building-up of just that group, and performing the required action with respect to all items allocated to a selected receiver substation in response to detection of a color marking or changed orientation of the item.

8. The method according to claim 1, wherein at least two combined receiver stations are provided such that at least one of the combined receiver stations is operated such that items allocated thereto are collected in separately packed subgroups which are thereafter transferred to a respective final group.

9. A weighing-out apparatus of the grader type comprising:

a weighing-in station, a sorting-out path extending from the weighing-in station, a row of receiver stations located along said sorting-out path, diverter means for selectively diverting selected items from said sorting-out path to respective receiver stations, a control unit for controlling the diverter means and connected with the weighing station, said control unit being adapted to build up item groups of predetermined accumulated weights in the receiver stations, wherein at least some of the receiver stations are operationally and physically grouped as receiver substations in such a manner that they will deliver their received items to a single final group collector having a final batch weight, and wherein the control unit is programmed so as to decide, for each item, whether the item should be allocated to one or another receiver substation wherein allocation of the item to a particular substation is controlled such that the weight of at least one of the substations compensates for the weight of other substations in order to provide a final batch weight within a predetermined tolerance.

10. An apparatus according to claim 9, wherein each of the receiver stations comprises an upper receiving mouth opening and chute means for guiding received items to underlying collector means located below said mouth opening, said chute means being arranged so as to be common for two or more of said grouped receiver substations.

11. An apparatus according to claim 9, comprising detector means for detecting a relevant criterion characteristic of the incoming items.

12. A method of controlling operation of a weighing-out apparatus of the grader type having a weighing-in station, a sorting-out path, at least one row of receiver stations with associated diverter means for enabling selective transfer of items to said receiver stations, a conveyor for moving articles serially through said weighing-in station and along a sorting-out path, at least one row of receiver stations arranged along said sorting-out path, a control unit connected with the weighing-in station, comprising the steps of:

serially conveying articles through said weighing-in station, weighing the articles and conveying the articles weighed along said sorting-out path, using said control unit to operate said diverter means in a manner effecting an accumulative and weight determined build-up of desired groups of items in respective receiver stations, using at least two of the receiver stations as a single combined station, items being allocated to the receiver stations of the combined station by the control unit as a single batch with an associated target weight using specific criteria for determining whether items should be allocated to a respective one of the receiver stations of the combined station, or to any one of a number of other such combined receiver stations; and merging of items allocated to the receiver stations of the combined station.

13. The method according to claim 12, wherein said specific criteria pertain to physical characteristics other than item weight.

14. The method according to claim 13, wherein the criteria characteristics pertain to physical appearance of the items.

15. The method according to claim 14, wherein the criteria characteristics that pertain to physical appearance of the items are selected from the group consisting of type, shape and color.

16. The method according to claim 12, the specific criteria are ascertained by detecting characteristics of the individual items prior to entry thereof into said sorting-out path and feeding characteristics detected to said control unit.

* * * * *